(12) United States Patent
Bagschik et al.

(10) Patent No.: US 11,307,047 B2
(45) Date of Patent: Apr. 19, 2022

(54) HEAD-UP DISPLAY DEVICE FOR A TRANSPORTATION VEHICLE, METHOD, DEVICE AND COMPUTER-READABLE RECORDING MEDIUM WITH INSTRUCTIONS FOR CONTROLLING A DISPLAY OF A HEAD-UP DISPLAY DEVICE

(71) Applicant: VOLKSWAGEN AKTIENGESELLSCHAFT, Wolfsburg (DE)

(72) Inventors: Silke Bagschik, Wolfsburg (DE); Andreas Lassota, Braunschweig (DE)

(73) Assignee: Volkswagen AG

( * ) Notice: Subject to any disclaimer, the term of this patent is extended or adjusted under 35 U.S.C. 154(b) by 10 days.

(21) Appl. No.: 16/471,487

(22) PCT Filed: Oct. 16, 2017

(86) PCT No.: PCT/EP2017/076373
§ 371 (c)(1),
(2) Date: Jun. 19, 2019

(87) PCT Pub. No.: WO2018/114078
PCT Pub. Date: Jun. 28, 2018

(65) Prior Publication Data
US 2019/0316928 A1  Oct. 17, 2019

(30) Foreign Application Priority Data

Dec. 20, 2016 (DE) .................... 10 2016 225 639.4

(51) Int. Cl.
*G01C 21/36* (2006.01)
*B60K 35/00* (2006.01)
*G08G 1/16* (2006.01)
*G02B 27/01* (2006.01)

(52) U.S. Cl.
CPC ............ *G01C 21/365* (2013.01); *B60K 35/00* (2013.01); *G08G 1/167* (2013.01); *G02B 2027/0138* (2013.01)

(58) Field of Classification Search
CPC ...... G01C 21/365; B60K 35/00; G08G 1/167; G02B 2027/0138; G02B 2027/0159; G02B 27/0149; G02B 27/01
See application file for complete search history.

(56) References Cited

U.S. PATENT DOCUMENTS 5,760,884 A * 6/1998 Yahashi .................... B60T 7/22
356/3.14
7,605,773 B2 * 10/2009 Janssen .................. B60K 35/00
345/7

(Continued)

FOREIGN PATENT DOCUMENTS

CN 101915990 A 12/2010
CN 102735253 A 10/2012

(Continued)

OTHER PUBLICATIONS

Search Report for International Patent Application No. PCT/EP2017/076373; dated Jan. 19, 2018.

(Continued)

*Primary Examiner* — Ryan W Sherwin
(74) *Attorney, Agent, or Firm* — Barnes & Thornburg LLP (57) ABSTRACT

A head-up display device for a transportation vehicle and a method, a device and a computer-readable recording medium with instructions for controlling a display of a head-up display device for a transportation vehicle. A road course ahead of the transportation vehicle is determined and the contents shown by the head-up display device are then displaced according to the road course that was determined.

20 Claims, 5 Drawing Sheets

(56) References Cited

U.S. PATENT DOCUMENTS

| | | |
|---|---|---|
| 8,514,276 B2 | 8/2013 | Ishii |
| 8,653,961 B2 | 2/2014 | Kumon |
| 8,704,653 B2 | 4/2014 | Seder et al. |
| 2006/0176210 A1* | 8/2006 | Nakamura ............... B60R 1/00 342/45 |
| 2009/0326761 A1* | 12/2009 | Nitta ..................... B62D 6/001 701/41 |
| 2010/0253540 A1* | 10/2010 | Seder .................. G01S 13/867 340/905 |
| 2012/0259546 A1 | 10/2012 | Kim |
| 2012/0300061 A1* | 11/2012 | Osman ................... G06F 3/013 348/135 |
| 2014/0379260 A1* | 12/2014 | Maihoefer .......... G01C 21/365 701/538 |
| 2015/0220755 A1* | 8/2015 | Mayer .................. G06F 21/606 726/30 |
| 2016/0124231 A1* | 5/2016 | Watanabe ............. B60K 35/00 359/633 |
| 2016/0179195 A1* | 6/2016 | Motz ..................... G09G 3/001 345/156 |

FOREIGN PATENT DOCUMENTS

| | | |
|---|---|---|
| DE | 19813300 A1 | 10/1999 |
| DE | 102005035412 A1 | 2/2007 |
| DE | 102010013532 A1 | 10/2010 |
| DE | 102012001951 A1 | 8/2013 |
| DE | 102013110332 A1 | 6/2014 |
| DE | 102014001270 A1 | 8/2015 |
| DE | 102014226860 A1 | 6/2016 |
| DE | 102015109027 A1 | 12/2016 |
| EP | 1783531 A1 | 5/2007 |
| JP | 2001301486 A | 10/2001 |
| JP | 2002019491 A | 1/2002 |
| JP | 2010128000 A | 6/2010 |
| JP | 2015064434 A | 4/2015 |
| JP | 2016101805 A | 6/2016 |
| JP | 2016210212 A | 12/2016 |
| KR | 20100105293 A | 9/2010 |
| KR | 20130089139 A | 8/2013 |
| KR | 20150132426 A | 11/2015 |
| WO | 2009071139 A1 | 6/2009 |
| WO | 2016062936 A1 | 4/2016 |

OTHER PUBLICATIONS

Office Action for Korean Patent Application No. 10-2019-7021326; dated Oct. 23, 2020.
Office Action for Korean Patent Application No. 10-2019-7021326; dated Jan. 19, 2022.
Office Action for Chinese Patent Application No. 2017800849369; dated Jan. 24, 2022.

* cited by examiner

HEAD-UP DISPLAY DEVICE FOR A TRANSPORTATION VEHICLE, METHOD, DEVICE AND COMPUTER-READABLE RECORDING MEDIUM WITH INSTRUCTIONS FOR CONTROLLING A DISPLAY OF A HEAD-UP DISPLAY DEVICE

PRIORITY CLAIM

This patent application is a U.S. National Phase of International Patent Application No. PCT/EP2017/076373, filed 16 Oct. 2017, which claims priority to German Patent Application No. 10 2016 225 639.4, filed 20 Dec. 2016, the disclosures of which are incorporated herein by reference in their entireties.

SUMMARY

Illustrative embodiments relate to a method, an apparatus and a computer-readable storage medium having instructions for controlling a display of a head-up-display apparatus for a transportation vehicle. Illustrative embodiments also relate to a head-up-display apparatus for a transportation vehicle and to a transportation vehicle in which such a head-up-display apparatus, a disclosed method or a disclosed apparatus is used.

BRIEF DESCRIPTION OF THE DRAWINGS

Disclosed embodiments are described below with references to the drawings, in which:

FIG. 5 shows the content generated by an image generation unit of the head-up-display apparatus when traveling straight on;

DETAILED DESCRIPTION

A head-up-display or a head-up-display apparatus is understood to mean a display system in which the user can maintain his line of vision, since the content to be depicted is shown in his field of vision. While such systems were initially used substantially in aviation owing to their complexity and costs, they are now also being installed in the automotive sector in large-scale production.

Head-up-displays generally consist of an imaging unit, an optical module and a projection area. The imaging unit generates the image. The optical module routes the image to the projection area. This area is a partially reflective, light-transmissive pane. The user thus sees the content depicted by the imaging unit and at the same time the real world behind the pane. The projection area used in the automotive sector is often the windshield, the curved shape of which needs to be taken into consideration for the depiction. As an alternative, an additional plastic pane is sometimes also used, this being arranged between the driver and the windshield on the dashboard.

Typically, both static information and contact-analogous information are depicted. Static information is understood to mean information that is always at the same location in the field of vision of the driver. Examples are the transportation vehicle speed, speed limits or the engine speed. Contact-analogous information is shown to the driver in his field of vision such that it appears to him as a fixed part of the environment. By way of example, a navigation arrow appears directly on the road.

Against this background, the document DE 10 2014 001 270 A1 describes a head-up-display for a transportation vehicle in which particular reproduction properties of the depicted objects are dependent on the line of vision of the driver. A first sensor system is used to capture objects in the surroundings of the transportation vehicle. A further sensor system is used to determine the line of vision of the driver. The detected objects are then shown in the display such that they appear for the driver in a manner substantially coincident with the actual objects, that is to say such that a contact-analogous depiction is achieved.

The document DE 10 2014 226 860 A1 describes a method for operating a head-up-display of a transportation vehicle in which properties of the depiction are dependent on the line of vision of the driver. A sensor system is used to determine the line of vision of the driver. If the driver looks in the direction of the head-up-display, the depiction is altered such that the information displayed thereon becomes easily readable for the driver. Otherwise, the head-up-display is in an idle state in which the display of the head-up-display is barely or categorically not perceived by the driver.

One problem with using a head-up-display apparatus in a transportation vehicle can be that the driver can be unconsciously prompted, by his eyes being on the depicted content, to steer the transportation vehicle into the line of vision.

Disclosed embodiments demonstrate improved solutions for a head-up-display apparatus for a transportation vehicle and also the control of a display of a head-up-display apparatus for a transportation vehicle that result in a higher level of safety and greater convenience for the driver of the transportation vehicle.

This is achieved by a method, by an apparatus, by a computer-readable storage medium having instructions and by a head-up-display apparatus for a transportation vehicle.

According to a first disclosed embodiment, a method for controlling a display of a head-up-display apparatus for a transportation vehicle comprises the operations of:

determining a road profile ahead of the transportation vehicle; and displaying the content depicted by the head-up-display apparatus according to the determined road profile.

According to a further disclosed embodiment, an apparatus for controlling a display of a head-up-display apparatus for a transportation vehicle has:

an evaluation unit for determining a road profile ahead of the transportation vehicle; and a control unit for displaying the content depicted by the head-up-display apparatus according to the determined road profile.

According to a further disclosed embodiment, a computer-readable storage medium contains instructions that, when executed by a computer, prompt the computer to carry out the following operations for controlling a display of a head-up-display apparatus for a transportation vehicle:

determining a road profile ahead of the transportation vehicle; and displaying the content depicted by the head-up-display apparatus according to the determined road profile.

The term computer is intended to be understood broadly in this case. It also comprises controllers and other processor-based data processing apparatuses.

According to a further disclosed embodiment, a disclosed method or a disclosed apparatus are used in a head-up-display apparatus for a transportation vehicle.

According to the disclosed embodiments, the depicted content, i.e., the displayed image, is displaced laterally or else in regard to height, that is to say horizontally or vertically, according to the road profile lying ahead of the transportation vehicle. Instead of remaining at a fixed location relative to the windshield, the image is dynamically relocated during cornering to keep the information in the field of vision of the driver. To this end, the head-up-display apparatus alters the destination of its projection according to the curve to be taken, during ascent or descent and other driving maneuvers for which the visual axis of the driver are not concordant with a projection at a fixed location on the windshield. In head-up-display apparatuses based on the prior art, the projected image appears in a manner fixed at a certain distance ahead of the transportation vehicle. The image rigidly ahead of the transportation vehicle appears to float above the precipice, e.g., when cornering in the mountains, while the eyes of the driver should actually be directed into the curve to steer the transportation vehicle in a focused manner. The projection onto a fixed position ahead of the transportation vehicle even when cornering can almost seduce the driver into continuing to drive straight on instead of following the curve when his eyes are on the depicted content. When the disclosed solution is used, the driver always looks in the future direction of travel even when his eyes are on the depicted content, which leads to increased safety.

According to at least one disclosed embodiment, the content depicted by the head-up-display apparatus is displaced such that it appears for the driver in a manner centered in relation to his lane. In this manner, the eyes of the driver are directed more or less into the lane. The driver thus looks precisely in the direction in which he also needs to drive, so that he can devote his full attention to the path of travel lying ahead of him. Optionally, the user can stipulate a maximum value for the displacement. Similarly, it is possible for the user to stipulate the dependency of the displacement on the road profile or to shut down the displacement completely. If the user finds larger displacements disagreeable, for example, he can set the depicted content to admittedly follow the road profile in general, but only to a lesser extent. In this case, depicted content does not appear in a manner centered in relation to the lane. Nevertheless, the eyes of the driver are at least still directed into the lane to a certain degree.

According to at least one disclosed embodiment, the road profile is determined from a steering angle of a steering wheel of the transportation vehicle, from navigation data of a navigation system of the transportation vehicle, from data of an ambient sensor system of the transportation vehicle or from eye displacements of the driver. Transportation vehicles today regularly have a steering angle sensor, which means that no sensor systems giving rise to additional costs are required. The use of the navigation data in the case of a transportation vehicle having a navigation system allows a predictive displacement of the depicted content to be realized, i.e., the position of the depicted content is already adapted shortly before the start of a curve. In this manner, the attention of the driver is directed to the imminent curve in good time. The road profile can also be ascertained by an ambient sensor system of the transportation vehicle, for example, using a camera installed in the region of the rear view mirror. Such cameras are frequently present in transportation vehicles having higher-end equipment, so that, apart from the image evaluation, which may already be performed for lateral guidance, however, no additional components are needed. This approach also works in areas in which no navigation signals are received. A further, but less accurate, option is evaluation of the eye movements of the driver. Assuming that the driver is looking in the planned direction of travel, the position of the depicted content can be adapted according to the line of vision. In this case, it is advisable to use a filter to reject faster, brief eye movements. Head-up-display apparatuses are today often coupled to a sensor system for capturing eye or head movements, which means that in this case too it is possible to resort to the available sensor system.

According to at least one disclosed embodiment, the displaying of the content depicted by the head-up-display apparatus is effected by virtue of a rotation of a mirror or of a prism of a projection unit of the head-up-display apparatus. In a head-up-display apparatus, the depicted content is generated by a projection unit and projected onto the windshield by mirrors or prisms. Normally, at least one of these optical components is movably mounted to be able to adapt the position of the depicted content on the windshield. This circumstance can be exploited to position the depicted content according to the road profile by virtue of the rotation of the optical component. Alternatively, the displacement can also be effected by displaying the depicted content on an image generation unit of the head-up-display apparatus. The image generation unit can in this case be part of the projection unit of the head-up-display apparatus, e.g., as a matrix display. The image generation unit can alternatively be integrated in the windshield or a display panel of the transportation vehicle, for example, as a flexible screen film. An example of a flexible screen film of this kind is OLED (organic light-emitting diode) display films. In this context, the content is displaced vertically and horizontally, and optimized, directly on the display integrated in the windshield.

Optionally, a disclosed method, a disclosed apparatus or a disclosed head-up-display apparatus are used in an autonomously or manually controlled vehicle, in particular, a transportation vehicle.

To improve understanding of the principles of the present disclosure, exemplary embodiments are explained in more detail below with reference to the Figs. It goes without saying that the disclosure is not restricted to these embodiments and that the features described can also be combined or modified without departing from the scope of protection of the disclosure as defined in the appended claims.

Figure 1:
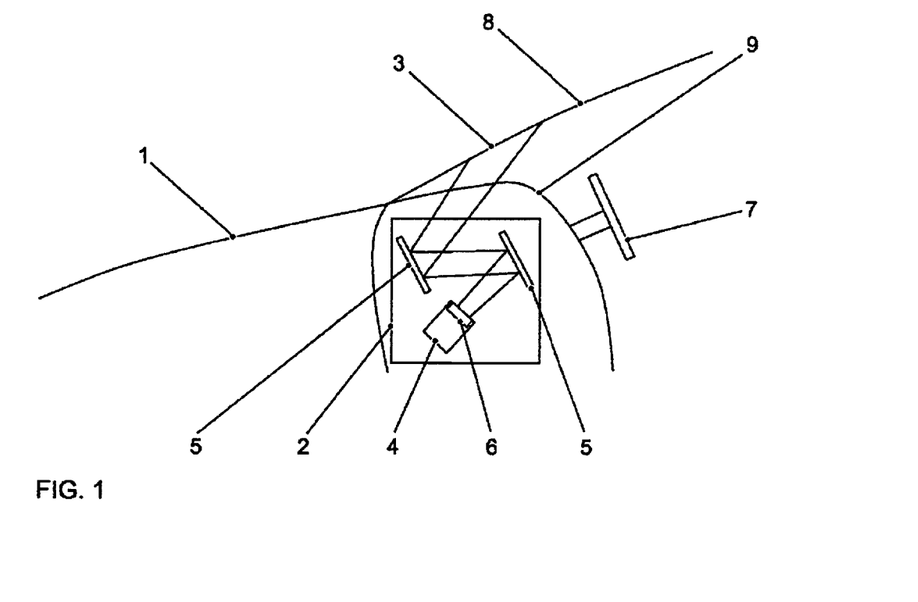
FIG. 1 schematically shows a head-up-display apparatus for a transportation vehicle.

FIG. 1 schematically shows a head-up-display apparatus 2 for a transportation vehicle 1, which head-up-display apparatus can be used to display content 3 on a windshield 8 of the transportation vehicle. The depicted content 3 is generated by a projection unit 4 and projected onto the windshield 8 by mirrors 5. Normally, one of the mirrors 5 is movably mounted to be able to adapt the position of the depicted content on the windshield 8. Typically, the projection in this case is effected into a region of the windshield 8 above the steering wheel 7. The projection unit 4 comprises an image generation unit 6, for example, a combination of an LED (light-emitting diode) matrix and a TFT (thin-film transistor) color display. The head-up-display apparatus 2 is installed in a dashboard 9 of the transportation vehicle 1.

Figure 2:
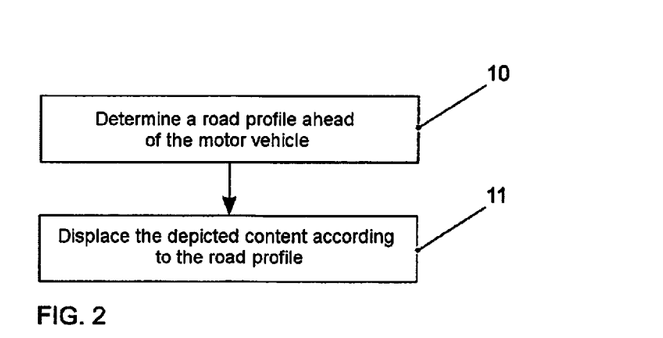
FIG. 2 schematically shows a method for controlling a display of a head-up-display apparatus for a transportation vehicle.

FIG. 2 schematically shows a method for controlling a display of a head-up-display apparatus for a transportation vehicle. In a first operation, a road profile ahead of the transportation vehicle is determined 10, for example, from a steering angle of the steering wheel of the transportation vehicle, from navigation data of a navigation system of the transportation vehicle, from data of an ambient sensor system of the transportation vehicle or from eye movements of the driver. The content depicted by the head-up-display apparatus is then displaced 11 according to the determined road profile. Optionally, the depicted content is displaced such that it appears to the driver in a manner centered in relation to his lane, that is to say directs his eyes more or less into the lane. The displacing of the content depicted by the head-up-display apparatus can be effected, for example, by virtue of a rotation of a mirror or a prism of the projection unit of the head-up-display apparatus or by displacing the depicted content on an image generation unit of the head-up-display apparatus. The image generation unit in this case can be integrated in a windshield or a display panel of the transportation vehicle or can be part of the projection unit of the head-up-display apparatus.

Figure 3:
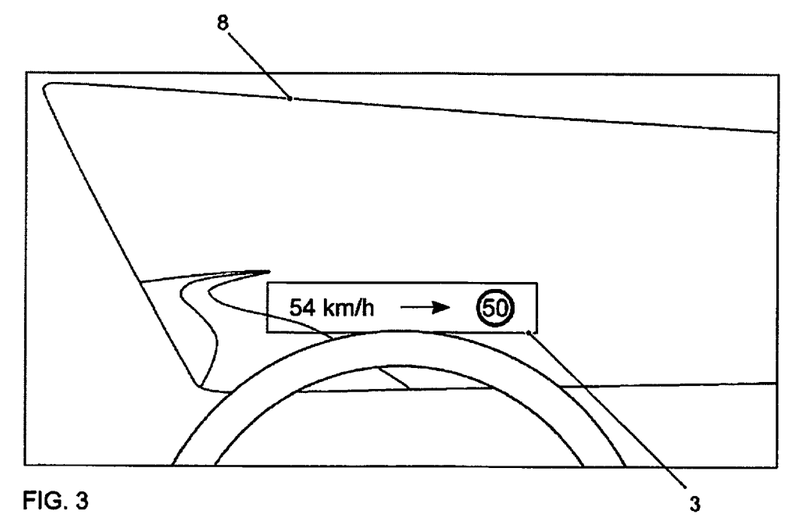
FIG. 3 shows the content depicted by the head-up-display apparatus from the point of view of the driver without a displacement according to the road profile.
Figure 4:
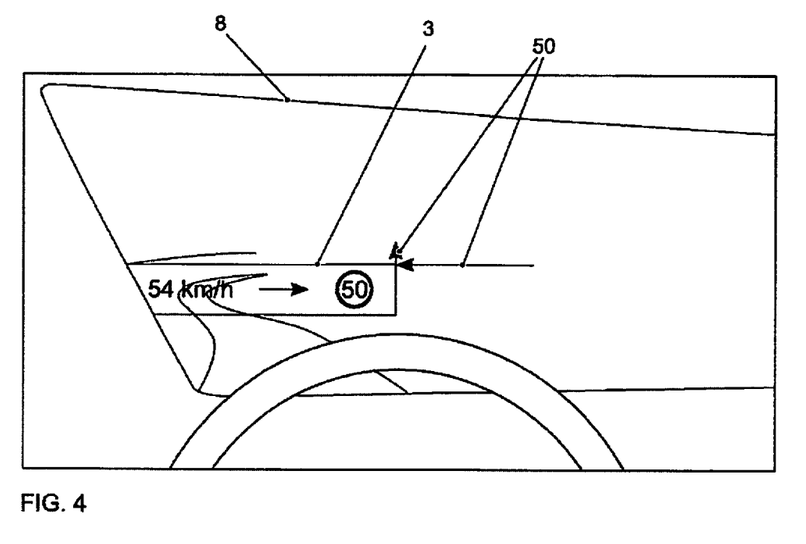
FIG. 4 shows the content depicted by the head-up-display apparatus from the point of view of the driver with a displacement according to the road profile.

FIG. 3 and FIG. 4 demonstrate the effects of a displacement of the content 3 depicted on the windshield 8 of the transportation vehicle by the head-up-display apparatus according to the road profile from the point of view of the driver. In FIG. 3, the content 3 is not displaced according to the road profile, i.e., the projected image is fixed at a certain distance ahead of the transportation vehicle 1. As can be seen, the depicted content 3 appears in a manner offset from the road, which can unconsciously prompt the driver to continue to drive straight on, instead of following the curve, when his eyes are on the depicted content. In FIG. 4, on the other hand, the content 3 is displaced according to the road profile, as indicated in FIG. 4 by the displacement vectors 50 shown. The depicted content 3 appears in a manner substantially centered in relation to the lane in this case, which increases driving safety. Optionally, the size of the space available for the depicted content 3 is taken into consideration for the displacement. In FIG. 4, it can be seen that the depicted content 3 has just enough space on the windshield 8. A displacement even further to the left would lead to the depicted content 3 being partially cut off. To prevent this, the displacement can be limited to a maximum value.

Figure 5:
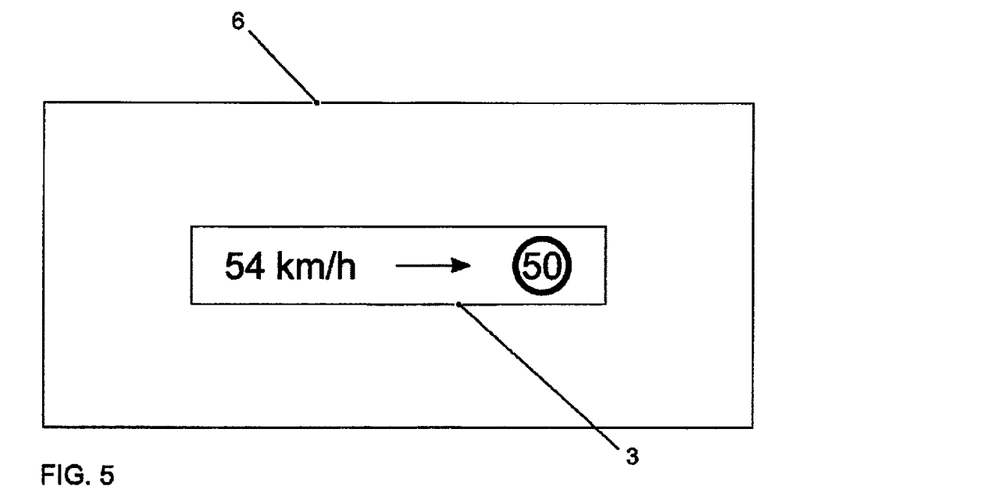
Figure 6:
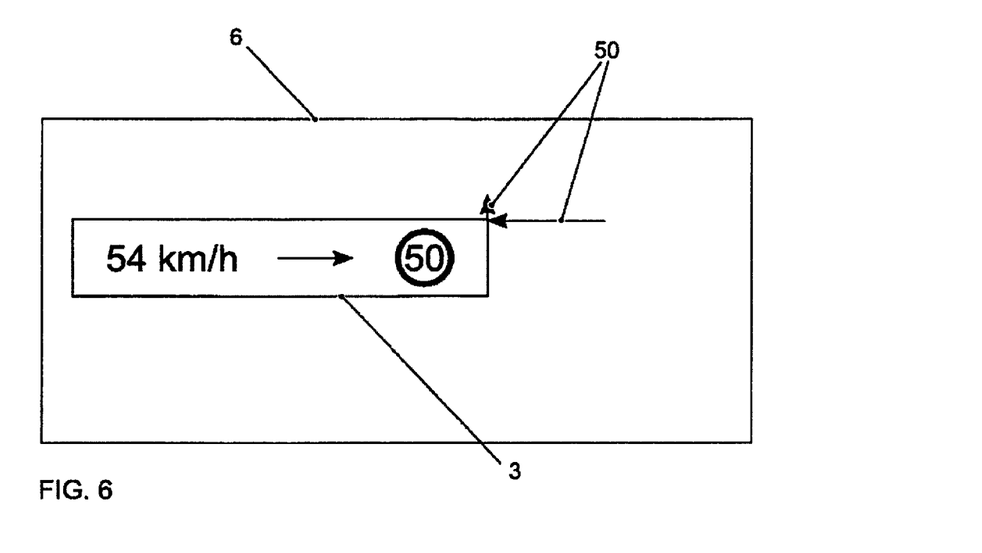
FIG. 6 shows the content generated by an image generation unit of the head-up-display apparatus when cornering.

FIG. 5 and FIG. 6 show examples of the content 3 generated by the image generation unit 6 of the head-up-display apparatus. FIG. 5 shows the content 3 when traveling straight on, FIG. 6 shows the content 3 when cornering. The image generation unit 6 is, for example, the combination of an LED matrix and a TFT color display already cited in connection with FIG. 1, the combination being installed in the projection unit of the head-up-display apparatus, or is an image generation unit 6, e.g., a flexible screen film, integrated in the windshield or a display panel of the transportation vehicle. While travelling straight on, the generated content 3 is arranged centrally on the image generation unit 6 in the present example. When there is a curve in the road profile ahead of the transportation vehicle, the generated content 3 is arranged eccentrically on the image generation unit 6. The direction and size of the displacement, which are indicated in FIG. 6 by the displacement vectors 50 shown, are in this case dependent on the road profile and possibly on the optical beam path within the head-up-display apparatus.

Figure 7:
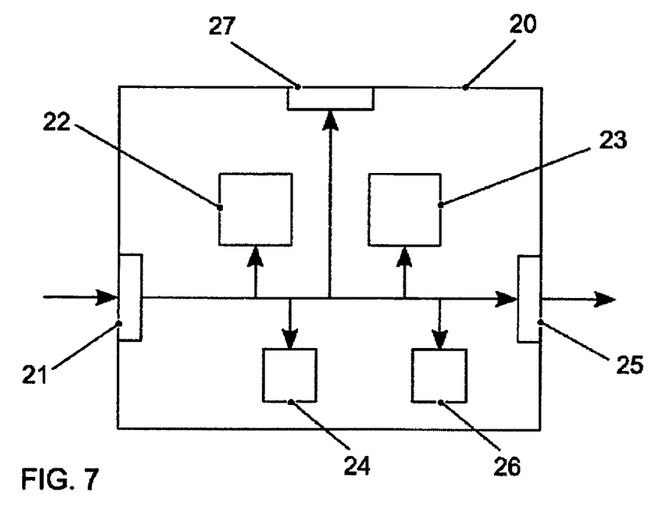
FIG. 7 shows a first embodiment of an apparatus for controlling a display of a head-up-display apparatus for a transportation vehicle.

FIG. 7 shows a simplified schematic depiction of a first disclosed embodiment of an apparatus 20 for controlling a display of a head-up-display apparatus for a transportation vehicle. The apparatus 20 has an input 21 for receiving data permitting determination of a road profile ahead of the transportation vehicle. By way of example, these can be data pertaining to the steering angle of the steering wheel of the transportation vehicle, navigation data of a navigation system of the transportation vehicle, data of an ambient sensor system of the transportation vehicle or information pertaining to eye movements of the driver. From the received data, an evaluation unit 22 determines the road profile ahead of the transportation vehicle. A control unit 23 then displaces the content depicted by the head-up-display apparatus according to the determined road profile. The displacing of the content depicted by the head-up-display apparatus can be effected, for example, by virtue of a rotation of a mirror or of a prism of the projection unit of the head-up-display apparatus or by displacing the depicted content on an image generation unit of the head-up-display apparatus. The image generation unit in this case can be integrated in a windshield or a display panel of the transportation vehicle or can be part of the projection unit of the head-up-display apparatus. The data needed for the displacement are provided via an output 25 of the apparatus 20. The evaluation unit 22 and the control unit 23 can be controlled by a supervisory unit 24. A user interface 27 can be used to change settings of the evaluation unit 22, of the control unit 23 or of the supervisory unit 24 if need be. The data obtained in the apparatus 20 can also be stored in a memory 26 of the apparatus 20, for example, for later evaluation. The evaluation unit 22, the control unit 23 and the supervisory unit 24 can be realized as dedicated hardware, for example, as integrated circuits. Naturally, they can also be partially or completely combined or implemented as software running on a suitable processor, however. The input 21 and the output 25 can be implemented as separate interfaces or as a combined bidirectional interface.

Figure 8:
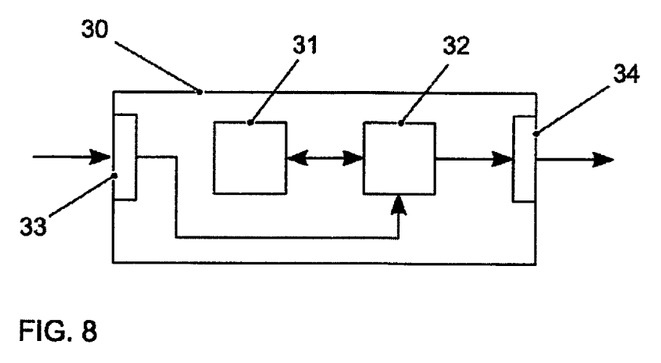
FIG. 8 shows a second embodiment of an apparatus for controlling a display of a head-up-display apparatus for a transportation vehicle.

FIG. 8 shows a simplified schematic depiction of a second disclosed embodiment of an apparatus 30 for controlling a display of a head-up-display apparatus for a transportation vehicle. The apparatus 30 has a processor 32 and a memory 31. By way of example, the apparatus 30 is a computer or a controller. The memory 31 stores instructions that prompt the apparatus 30, when executed by the processor 32, to carry out the operations according to one of the methods described. The instructions stored in the memory 31 therefore embody a program, executable by the processor 32, that realizes the disclosed method. The apparatus has an input 33 for receiving information. Data generated by the processor 32 are provided via an output 34. Besides this, they can be stored in the memory 31. The input 33 and the output 34 can be combined to form a bidirectional interface.

The processor 32 can comprise one or more processor units, for example, microprocessors, digital signal processors or combinations of these.

The memories 26, 31 of the disclosed embodiments described can have both volatile and nonvolatile memory areas and can comprise a wide variety of storage devices and storage media, for example, hard disks, optical storage media or semiconductor memories.

Figure 9:
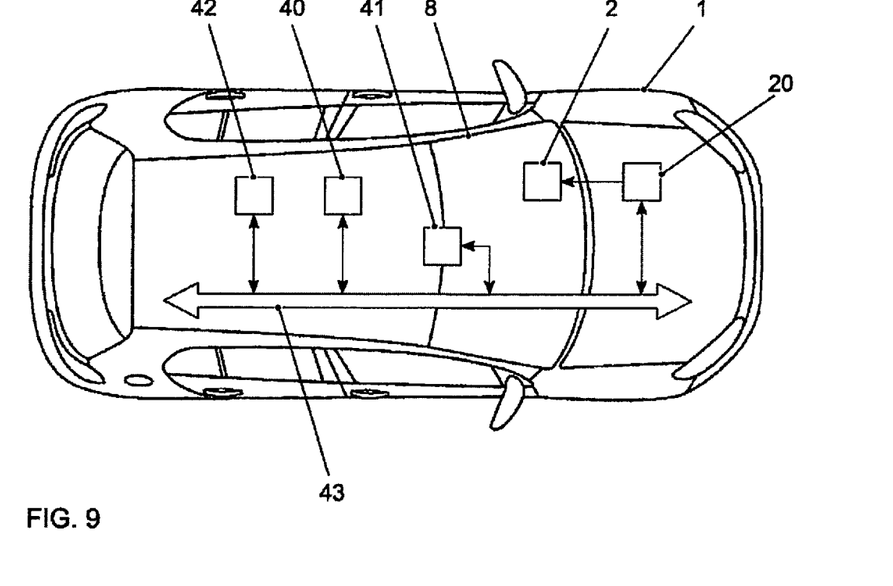
FIG. 9 schematically depicts a transportation vehicle in which a disclosed solution is realized.

FIG. 9 schematically depicts a transportation vehicle 1 in which a disclosed solution is realized. The transportation vehicle has a head-up-display apparatus 2 that is used to depict information on the windshield 8 of the transportation vehicle 1 or on an additional pane (not shown) arranged between the driver and the windshield 8. The head-up-display apparatus 2 is actuated by an apparatus 20 for controlling the display of the head-up-display apparatus. Additionally, the transportation vehicle 1 has a navigation system 40 and an ambient sensor system 41, for example, a camera system. From data pertaining to the steering angle of the steering wheel of the transportation vehicle, navigation data of the navigation system of the transportation vehicle or data of the ambient sensor system, the apparatus 20 ascertains a road profile ahead of the transportation vehicle 1 and actuates the head-up-display apparatus 2 accordingly. The transmission of the data within the transportation vehicle 1 is effected using a network 43, to which further controllers 42 can be connected.

LIST OF REFERENCE SIGNS

1 Transportation vehicle
2 Head-up-display apparatus
3 Depicted content
4 Projection unit
5 Mirror
6 Image generation unit
7 Steering wheel
8 Windshield
9 Dashboard
10 Determine a road profile ahead of the transportation vehicle
11 Displace the depicted content according to the road profile
20 Apparatus
21 Input
22 Evaluation unit
23 Control unit
24 Supervisory unit
25 Output
26 Memory
27 User interface
30 Apparatus
31 Memory
32 Processor
33 Input
34 Output
40 Navigation system
41 Ambient sensor system
42 Controller
43 Network
50 Displacement vector

The invention claimed is:

1. A method for controlling a display of a head-up-display apparatus for a transportation vehicle, the method comprising:
generating content for a depiction by the head-up-display apparatus, wherein the generated content contains at least static information;
determining a road profile ahead of the transportation vehicle, the road profile including an upcoming curve to be taken by the transportation vehicle, an ascent to be ascended by the transportation vehicle, or a descent to be descended of the transportation vehicle;
depicting the generated content in a first position on the head-up-display apparatus; and
moving the content depicted by the head-up-display apparatus to a second position on the head-up-display apparatus based on the determined road profile so the static information is depicted in a field of vision of a driver of the transportation vehicle that is determined by the road profile,
wherein the moving of the content includes at least one of (i) displacing the content a first horizontal distance along a horizontal displacement vector and (ii) displacing the content a first vertical distance along a vertical displacement vector based on at least one of the upcoming curve to be taken, the ascent to be ascended, and the descent to be descended by the transportation vehicle,
wherein the road profile is determined based on eye movements of the driver, and
wherein the determination of the road profile is prevented from taking into account fast, brief eye movements of the driver's eyes in a first direction using a filter.

2. The method as claimed in of claim 1, wherein the content depicted by the head-up-display apparatus is displaced so the content is centered for the driver in relation to his lane.

3. The method of claim 1, wherein the road profile is further determined based on at least one of a steering angle of a steering wheel of the transportation vehicle, navigation data of a navigation system of the motor transportation vehicle, and data of an ambient sensor system of the transportation vehicle.

4. The method of claim 1, wherein displaying the content depicted by the head-up-display apparatus is effected by a rotation of a mirror or of a prism of a projection unit of the head-up-display apparatus or by displaying the depicted content on an image generation unit of the head-up-display apparatus.

5. The method of claim 4, wherein the image generation unit is integrated in a windshield or a display panel of the transportation vehicle or is part of the projection unit of the head-up-display apparatus.

6. The method of claim 1, wherein the displacing of the content the first horizontal distance along the horizontal displacement vector is based on the upcoming curve to be taken by the transportation vehicle and the displacing the content the first vertical distance along the vertical displacement vector is based on the ascent to be ascended or the descent to be descended by the transportation vehicle.

7. The method of claim 1, wherein the first horizontal distance and the first vertical distance are delimited by a size of space of a windshield of the transportation vehicle available for the content to be displaced.

8. An apparatus for controlling a display of a head-up-display apparatus for a transportation vehicle, the apparatus comprising:
an image generation unit for generating content for a depiction by the head-up-display apparatus, wherein the generated content contains at least static information;
an evaluation unit for determining a road profile ahead of the transportation vehicle, the road profile including an upcoming curve to be taken by the transportation vehicle, an ascent to be ascended by the transportation vehicle, or a descent to be descended of the transportation vehicle; and
a control unit for depicting the generated content in a first position on the head-up-display apparatus and moving the content depicted by the head-up-display apparatus to a second position on the head-up-display apparatus based on the determined road profile so the static information is depicted in a field of vision of the driver of the transportation vehicle that is determined by the road profile, wherein the moving of the content includes at least one of (i) displacing the content a first horizontal distance along a horizontal displacement vector and (ii) displacing the content a first vertical distance along a vertical displacement vector based on at least one of the upcoming curve to be taken, the ascent to be ascended, and the descent to be descended by the transportation vehicle, wherein the road profile is determined based on eye movements of the driver, and wherein the evaluation unit prevents the determination of the road profile from taking into account fast, brief eye movements of the driver's eyes in a first direction using a filter.

9. The apparatus of claim 8, wherein the control unit displaces the content depicted by the head-up-display apparatus so the content is centered for the driver in relation to his lane.

10. The apparatus of claim 8, wherein the evaluation unit further determines the road profile based on at least one of a steering angle of a steering wheel of the transportation vehicle, from navigation data of a navigation system of the transportation vehicle, and data of an ambient sensor system of the transportation vehicle.

11. The apparatus of claim 8, wherein the control unit realizes the displaying of the content depicted by the head-up-display apparatus by virtue of a rotation of a mirror or of a prism of a projection unit of the head-up-display apparatus or by displaying the depicted content on an image generation unit of the head-up-display apparatus.

12. The apparatus of claim 11, wherein the image generation unit is integrated in a windshield or a display panel of the transportation vehicle or is part of the projection unit of the head-up-display apparatus.

13. The apparatus of claim 8, wherein the displacement of the content the first horizontal distance along the horizontal displacement vector is based on the upcoming curve to be taken by the transportation vehicle and the displacement of the content the first vertical distance along the vertical displacement vector is based on the ascent to be ascended or the descent to be descended by the transportation vehicle.

14. The apparatus of claim 8, wherein the first horizontal distance and the first vertical distance are delimited by a size of space of a windshield of the transportation vehicle available for the content to be displaced.

15. A non-transitory computer-readable storage medium having instructions that, when executed by a computer, prompt the computer to carry out a method for controlling a display of a head-up-display apparatus for a transportation vehicle, the method comprising:

generating content for a depiction by the head-up-display apparatus, wherein the generated content contains at least static information;

determining a road profile ahead of the transportation vehicle, the road profile including an upcoming curve to be taken by the transportation vehicle, an ascent to be ascended by the transportation vehicle, or a descent to be descended of the transportation vehicle;

depicting the generated content in a first position on the head-up-display apparatus; and moving the content depicted by the head-up-display apparatus to a second position on the head-up-display apparatus based on the determined road profile so the static information is depicted in a field of vision of a driver of the transportation vehicle that is determined by the road profile, wherein the moving of the content includes at least one of (i) displacing the content a first horizontal distance along a horizontal displacement vector and (ii) displacing the content a first vertical distance along a vertical displacement vector based on at least one of the upcoming curve to be taken, the ascent to be ascended, and the descent to be descended by the transportation vehicle, wherein the road profile is determined based on eye movements of the driver, and wherein the instructions prevent the determination of the road profile from taking into account fast, brief eye movements of the driver's eyes in a first direction using a filter.

16. The non-transitory computer readable medium of claim 15, wherein the road profile is further determined based on at least one of a steering angle of a steering wheel of the transportation vehicle, navigation data of a navigation system of the motor transportation vehicle, and data of an ambient sensor system of the transportation vehicle.

17. A head-up-display apparatus for a transportation vehicle, the head-up-display apparatus comprising:

an apparatus for controlling a display of a head-up-display apparatus for a transportation vehicle, the apparatus comprising:

an image generation unit for generating content for a depiction by the head-up-display apparatus, wherein the generated content contains at least static information;

an evaluation unit for determining a road profile ahead of the transportation vehicle, the road profile including an upcoming curve to be taken by the transportation vehicle, an ascent to be ascended by the transportation vehicle, or a descent to be descended of the transportation vehicle; and a control unit for depicting the generated content in a first position on the head-up-display apparatus and moving the content depicted by the head-up-display apparatus to a second position on the head-up-display apparatus based on the determined road profile so the static information is depicted in a field of vision of the driver of the transportation vehicle that is determined by the road profile, wherein the moving of the content includes at least one of (i) displacing the content a first horizontal distance along a horizontal displacement vector and (ii) displacing the content a first vertical distance along a vertical displacement vector based on at least one of the upcoming curve to be taken, the ascent to be ascended, and the descent to be descended by the transportation vehicle, wherein the evaluation unit determines the road profile based on eye movements of the driver, and wherein a filter prevents the determination of the road profile from taking into account fast, brief eye movements of the driver's eyes in a first direction.

18. The heads-up display apparatus of claim 17, wherein the evaluation unit further determines the road profile based on at least one of a steering angle of a steering wheel of the transportation vehicle, navigation data of a navigation system of the transportation vehicle, and data of an ambient sensor system of the transportation vehicle.

19. A transportation vehicle, comprising:

a head-up-display apparatus for a transportation vehicle, the head-up-display apparatus comprising:

an apparatus for controlling a display of a head-up-display apparatus for a transportation vehicle, the apparatus comprising:

an image generation unit for generating content for a depiction by the head-up-display apparatus, wherein the generated content contains at least static information;

an evaluation unit for determining a road profile ahead of the transportation vehicle, the road profile including an upcoming curve to be taken by the transportation vehicle, an ascent to be ascended by the transportation vehicle, or a descent to be descended of the transportation vehicle; and a control unit for depicting the generated content in a first position on the head-up-display apparatus and moving the content depicted by the head-up-display apparatus to a second position on the head-up-display apparatus based on the determined road profile so the static information is depicted in a field of vision of the driver of the transportation vehicle that is determined by the road profile, wherein the moving of the content includes at least one of (i) displacing the content a first horizontal distance along a horizontal displacement vector and (ii) displacing the content a first vertical distance along a vertical displacement vector based on at least one of the upcoming curve to be taken, the ascent to be ascended, and the descent to be descended by the transportation vehicle, wherein the evaluation unit determines the road profile based on eye movements of the driver, and wherein a filter prevents the determination of the road profile from taking into account fast, brief eye movements of the driver's eyes in a first direction.

20. The transportation vehicle of claim 19, wherein the evaluation unit further determines the road profile based on at least one of a steering angle of a steering wheel of the transportation vehicle, navigation data of a navigation system of the transportation vehicle, and data of an ambient sensor system of the transportation vehicle.

* * * * *